(12) United States Patent
Shinohara (10) Patent No.: US 9,005,049 B2
(45) Date of Patent: Apr. 14, 2015

(54) SOLID GOLF BALL

(75) Inventor: Hirotaka Shinohara, Chichibushi (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 457 days.

(21) Appl. No.: 13/341,138

(22) Filed: Dec. 30, 2011

(65) Prior Publication Data

US 2013/0172106 A1   Jul. 4, 2013

(51) Int. Cl.
| | |
|---|---|
| A63B 37/04 | (2006.01) |
| A63B 37/06 | (2006.01) |
| A63B 37/00 | (2006.01) |
| C08G 18/48 | (2006.01) |
| C08G 18/66 | (2006.01) |
| C08G 18/76 | (2006.01) |
| C09D 175/04 | (2006.01) |
| C08L 75/04 | (2006.01) |

(52) U.S. Cl.
CPC ......... *A63B 37/0063* (2013.01); *A63B 37/0003* (2013.01); *A63B 37/0033* (2013.01); *A63B 37/0051* (2013.01); *A63B 37/0058* (2013.01); *A63B 37/0064* (2013.01); *A63B 37/0065* (2013.01); *A63B 37/0075* (2013.01); *A63B 37/0076* (2013.01); *A63B 37/0081* (2013.01); *A63B 37/0084* (2013.01); *C08G 18/4854* (2013.01); *C08G 18/6674* (2013.01); *C08G 18/7671* (2013.01); *C08L 75/04* (2013.01); *C09D 175/04* (2013.01)

(58) Field of Classification Search
USPC ................... 473/371–374, 376, 377
See application file for complete search history.

(56) References Cited

U.S. PATENT DOCUMENTS

| | | | | |
|---|---|---|---|---|
| 5,574,107 | A * | 11/1996 | Hiraoka et al. | 525/193 |
| 6,203,450 | B1 * | 3/2001 | Bradley et al. | 473/351 |
| 6,361,453 | B1 * | 3/2002 | Nakamura et al. | 473/371 |
| 6,642,314 | B2 * | 11/2003 | Sone et al. | 525/232 |
| 6,750,281 | B2 * | 6/2004 | Hirau et al. | 524/406 |
| 7,014,572 | B2 * | 3/2006 | Simonutti et al. | 473/352 |
| 7,294,680 | B2 | 11/2007 | Sone et al. | |
| 7,332,533 | B2 * | 2/2008 | Kim et al. | 523/216 |
| 7,999,019 | B2 * | 8/2011 | Nakamura et al. | 524/91 |
| 2008/0194359 | A1 * | 8/2008 | Higuchi et al. | 473/373 |
| 2009/0143170 | A1 * | 6/2009 | Ohira et al. | 473/385 |

FOREIGN PATENT DOCUMENTS

| | | |
|---|---|---|
| JP | 2002-293996 A | 10/2002 |
| JP | 2011-5329 A | 1/2011 |
| JP | 11-35633 A | 2/2011 |

* cited by examiner

*Primary Examiner* — Gene Kim
*Assistant Examiner* — John E Simms, Jr.
(74) *Attorney, Agent, or Firm* — Sughrue Mion, PLLC

(57) ABSTRACT

The invention provides a solid golf ball which has a core of at least one layer and a cover of at least one layer. At least one layer of the core is formed primarily of polybutadiene and includes at least 0.05 part by weight each of (I) a rubber powder obtained by granulating a rubber material containing acrylic acid or a metal salt of acrylic acid and (II) a polyurethane resin powder per 100 parts by weight of rubber component. At least one layer of the cover is formed primarily of polyurethane.

7 Claims, 2 Drawing Sheets

SOLID GOLF BALL

BACKGROUND OF THE INVENTION

The present invention relates to a solid golf ball having a cover made of polyurethane resin, which golf ball is endowed with a high rebound, a suitable feel on impact and an excellent durability.

Recently, from an environmental standpoint, the idea of utilizing waste materials by incorporating such materials in golf ball core- or cover-forming materials has begun to emerge in the golf ball industry. The basic characteristics of golf balls include flight performance, feel on impact, and durability. When a waste material is included in the core or cover, it is essential to choose the type and amount of waste material included in such a way as not to markedly worsen these basic properties.

For example, U.S. Pat. No. 6,203,450 describes the compounding of polyurethane rubber in the core material. However, the resulting golf ball can hardly be said to have a suitable feel, and moreover was unable to achieve a reduced spin rate.

Also, golf balls which use a polyurethane material as the cover material instead of the ionomers commonly used to date have become prominent lately. These golf balls with a polyurethane cover are capable of having an improved flight performance on shots with a driver, and also improved controllability owing to increased spin on approach shots.

JP-A 2011-005329 discloses that, by granulating an ionomer resin which was used as a cover material and including the granulated resin in a core-forming rubber composition, it is possible to utilize a waste material while suppressing a decline in ball performance.

However, the foregoing art does not make use of a polyurethane cover. Nor does it achieve improvements in the durability, spin performance and feel of golf balls which have a polyurethane cover and are composed of two or more pieces.

SUMMARY OF THE INVENTION

It is therefore an object of the present invention to provide a solid golf ball having a polyurethane cover, which golf ball is environmentally beneficial in that it utilizes a waste material, and moreover, in spite of utilizing a waste material, is able to maintain the basic characteristics of the ball at a high level.

As a result of extensive investigations, the inventor has discovered that, in a solid golf ball having a core formed primarily of polybutadiene rubber and a cover formed primarily of polyurethane, by selecting as the waste materials (I-a) a rubber powder obtained by granulating a rubber material containing methacrylic acid (MAA) or a metal salt thereof, (I-b) a rubber powder obtained by granulating a rubber material containing acrylic acid (AA) or a metal salt of acrylic acid, such as zinc acrylate (ZDA), and (II) a polyurethane resin powder and including specific amounts of these powders in the core-forming rubber composition, adhesion between the core and the cover dramatically improves. As a result, the ball maintains a high rebound and a high initial velocity and also achieves a spin rate lowering effect on full shots, enabling the distance traveled by the ball to be increased. In addition, the durability of the ball to cracking can be dramatically increased.

Accordingly, the invention provides the following solid golf ball.

[1] A solid golf ball comprising a core of at least one layer and a cover of at least one layer, wherein at least one layer of the core is formed primarily of polybutadiene and includes at least 0.05 part by weight each of (I-a) a rubber powder obtained by granulating a rubber material containing methacrylic acid or a metal salt thereof, (I-b) a rubber powder obtained by granulating a rubber material containing acrylic acid or a metal salt of acrylic acid, and (II) a polyurethane resin powder per 100 parts by weight of rubber component, and at least one layer of the cover is formed primarily of polyurethane.

[2] The solid golf ball of [1], wherein the core layer which includes the polyurethane resin powder (II) adjoins the cover layer composed primarily of polyurethane.

[3] The solid golf ball of [1], wherein the core includes at least 5 parts by weight of methacrylic acid and/or a metal salt of methacrylic acid as a co-crosslinking agent per 100 parts by weight of rubber component.

[4] The solid golf ball of [1], wherein the polyurethane resin powder (II) is granulated by a granulator to an average particle size of not more than 1 mm.

[5] The solid golf ball of [1], wherein the polyurethane resin powder (II) is composed primarily of thermoplastic polyurethane and has a flow starting point of from 150 to 320° C.

[6] The solid golf ball of [1], wherein the core has a hardness designed so as to gradually increase from a center of the core toward a surface of the core.

[7] The solid golf ball of [1] which has been produced by treating a surface of the core with a solution containing a haloisocyanuric acid and/or a metal salt thereof, then encasing the core in a cover layer.

BRIEF DESCRIPTION OF THE DIAGRAMS

DETAILED DESCRIPTION OF THE INVENTION

The invention is described more fully below.

Figure 1:
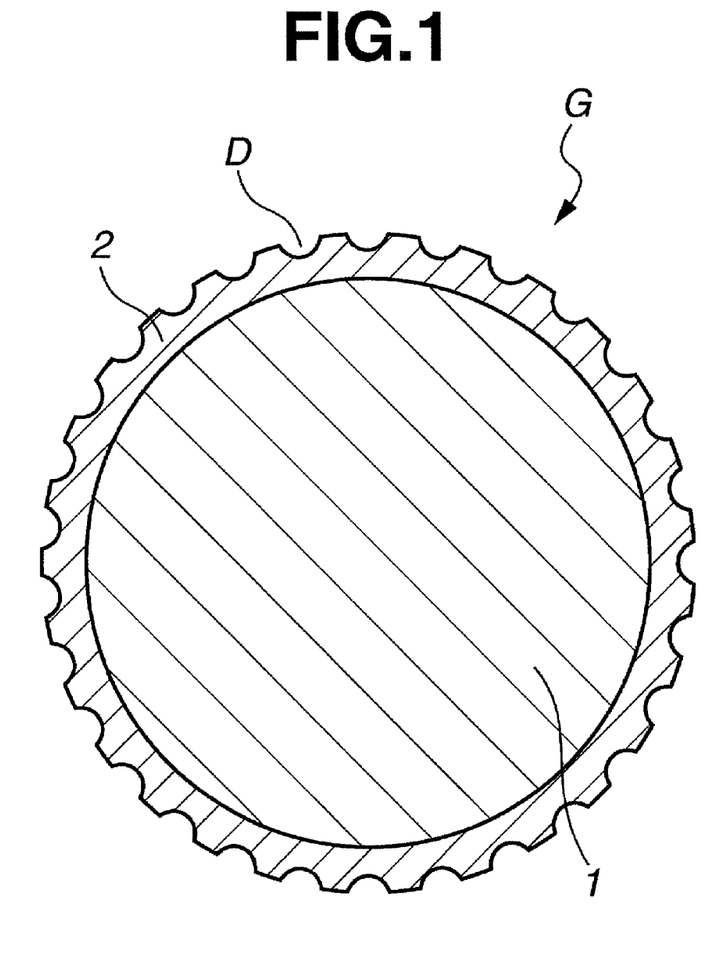
FIG. 1 is a schematic cross-sectional diagram of a solid golf ball according to one embodiment of the invention.

The internal structure of the solid golf ball of the present invention is made up of a core of at least one layer and a cover of at least one layer, and is exemplified by, as shown in FIG. 1, a golf ball G having a single-layer core 1 and a cover 2 with a plurality of dimples D formed on a surface thereof. The core 1 and the cover 2 may each be either a single layer or a plurality of two or more layers.

The core used in this invention is formed of a material composed primarily of a rubber material and including also two types of specific rubber powders (I-a) and (I-b), and (II) a polyurethane resin powder, all of which are subsequently described.

In the invention, preferred rubber compositions for forming the core are exemplified by the rubber compositions formulated as described below.

For example, the core may be formed using a rubber composition obtained by compounding, together with a known base rubber: an unsaturated carboxylic acid or a metal salt thereof, an organic peroxide, an inert filler, and an antioxidant.

Polybutadiene may be advantageously used as the base rubber. In particular, it is desirable for this polybutadiene to be one which includes cis-1,4 bonds on the polymer chain in a content of preferably at least 60 wt %, more preferably at least 80 wt %, even more preferably at least 90 wt %, and most preferably at least 95 wt %. If the cis-1,4 bonds account for too few of the bonds on the molecule, the resilience may decrease. The content of 1,2-vinyl bonds included in the above polybutadiene is preferably not more than 2 wt %, more preferably not more than 1.7 wt %, and even more preferably not more than 1.5 wt %, of the polymer chain. If the content of 1,2-vinyl bonds is too high, the rebound may decrease.

To obtain a molded and vulcanized material having a good resilience, the polybutadiene used is preferably one synthesized with a rare-earth catalyst or a Group VIII metal compound catalyst. Polybutadiene synthesized with a rare-earth catalyst is especially preferred in this invention. If necessary, an organoaluminum compound, an alumoxane, a halogen-bearing compound and a Lewis base may be used in combination with these catalysts. In the invention, preferred use may be made of, as the various above compounds, those compounds mentioned in JP-A 11-35633.

Of the above rare-earth catalysts, the use of a catalyst which employs a lanthanide series rare-earth compound is preferred. Examples of suitable lanthanide series rare-earth compounds include halides, carboxylates, alcoholates, thio-alcoholates and amides of atomic number 57 to 71 metals.

The use of a neodymium catalyst in which a neodymium compound serves as the lanthanide series rare-earth compound is recommended because such a catalyst enables a polybutadiene rubber having a high cis-1,4 bond content and a low 1,2-vinyl bond content to be obtained at an excellent polymerization activity. Preferred examples of such rare-earth catalysts include those mentioned in JP-A 11-35633, JP-A 11-164912 and JP-A 2002-293996. From the standpoint of increasing resilience, it is desirable for polybutadiene synthesized using a lanthanide series rare-earth compound catalyst to account for preferably at least 10 wt %, more preferably at least 20 wt %, and even more preferably at least 40 wt %, of the rubber components.

Rubber components other than the foregoing polybutadiene may be included in the rubber composition, insofar as the objects of the invention are attainable. Illustrative examples of rubber components other than the foregoing polybutadiene include other polybutadienes and other diene rubbers, such as styrene-butadiene rubber, natural rubber, isoprene rubber and ethylene-propylene-diene rubber.

Examples of unsaturated carboxylic acids include acrylic acid, methacrylic acid, maleic acid and fumaric acid. Acrylic acid and methacrylic acid are especially preferred.

Examples of metal salts of unsaturated carboxylic acids include metal salts of methacrylic acid, such as zinc methacrylate and magnesium methacrylate, and metal salts of acrylic acid, such as zinc acrylate. The use of zinc methacrylate or magnesium methacrylate is especially preferred.

The amount of the unsaturated carboxylic acid and/or metal salt thereof included per 100 parts by weight of the base rubber may be set to preferably at least 5 parts by weight, more preferably at least 10 parts by weight, and even more preferably at least 15 parts by weight. The upper limit may be set to preferably not more than 60 parts by weight, more preferably not more than 50 parts by weight, even more preferably not more than 40 parts by weight, and most preferably not more than 30 parts by weight. Including too much may make the ball too hard, resulting in an unpleasant feel on impact, whereas including too little may result in a poor durability and a decreased rebound.

The organic peroxide may be a commercially available product, suitable examples of which include Percumyl D (available from NOF Corporation), Perhexa 3M (NOF Corporation), Perhexa C40 (NOF Corporation), and Luperco 231XL (Atochem Co.).

The amount of organic peroxide included per 100 parts by weight of the base rubber may be set to preferably at least 0.1 part by weight, more preferably at least 0.3 part by weight, even more preferably at least 0.5 part by weight, and most preferably at least 0.7 part by weight. The upper limit may be set to preferably not more than 5 parts by weight, more preferably not more than 4 parts by weight, even more preferably not more than 3 parts by weight, and most preferably not more than 2 parts by weight. Too much or too little organic peroxide may make it impossible to achieve a ball having a good feel, durability and rebound.

Examples of inert fillers that may be preferably used include zinc oxide, barium sulfate and calcium carbonate. These may be used singly or as a combination of two or more thereof.

The amount of inert filler included per 100 parts by weight of the base rubber may be set to preferably at least 1 part by weight, and more preferably at least 5 parts by weight. The upper limit may be set to preferably not more than 100 parts by weight, more preferably not more than 80 parts by weight, and even more preferably not more than 60 parts by weight. Too much or too little inert filler may make it impossible to achieve a proper weight and a suitable rebound.

In addition, an antioxidant may be optionally included. Illustrative examples of suitable commercial antioxidants include Nocrac NS-6, Nocrac NS-30 and Nocrac 200 (all available from Ouchi Shinko Chemical Industry Co., Ltd.), and Yoshinox 425 (Yoshitomi Pharmaceutical Industries, Ltd.). These may be used singly or as a combination of two or more thereof.

The amount of antioxidant included may be more than 0, and is set to preferably at least 0.05 part by weight, and especially at least 0.1 part by weight, per 100 parts by weight of the base rubber. The upper limit, although not subject to any particular limitation, may be set to preferably not more than 3 parts by weight, more preferably not more than 2 parts by weight, even more preferably not more than 1 part by weight, and most preferably not more than 0.5 part by weight, per 100 parts by weight of the base rubber. Too much or too little antioxidant may make it impossible to obtain a suitable core hardness gradient, as a result of which a good rebound and durability and a good spin-rate lowering effect on full shots may not be achievable.

The core may be produced by using a known method to vulcanize and cure the rubber composition containing the various above ingredients. For example, production may be carried out by using a mixing apparatus such as a Banbury mixer or a roll mill to mix the rubber composition, compression molding or injection molding the mixed composition in a core mold, then curing the molded body by suitably heating at a temperature sufficient for the organic peroxide and co-crosslinking agent to act, such as under conditions of about 100 to 200° C. for a period of about 10 to 40 minutes. The core hardness profile of the invention may be achieved by a combination of the vulcanization conditions and adjustment of the rubber formulation.

The core diameter, although not subject to any particular limitation, is preferably at least 38.9 mm, and more preferably at least 39.3 mm, but is preferably not more than 42.1 mm, and more preferably not more than 41.1 mm. At a core diameter outside of this range, the durability of the ball to cracking may worsen dramatically and the initial velocity of the ball may decrease.

It is recommended that the core have a specific gravity of at least 1.05, preferably at least 1.08, and more preferably at least 1.1, but not more than 1.2, preferably not more than 1.15, and more preferably not more than 1.13.

The core deflection (CH) under loading, i.e., the deflection by the core when compressed under a final load of 1,275 N (130 kgf) from an initial load of 98 N (10 kgf), is typically at least 2.0 mm, preferably at least 2.3 mm, and more preferably at least 2.4 mm, but is typically not more than 7.0 mm, preferably not more than 6.0 mm, more preferably not more than 5.0 mm, and most preferably not more than 4.5 mm. If the core deflection (CH) is too small, the feel of the golf ball on impact may be so hard as to make the ball unpleasant to use. On the other hand, if the core deflection is too large, the feel of the golf ball on impact may be so soft as to make the ball unpleasant to use, in addition to which the productivity may decline considerably.

The core rebound (CV), is typically at least 65 m/s, more preferably at least 68 m/s, even more preferably at least 71 m/s, and most preferably at least 73 m/s, with the upper limit being preferably not more than 76 m/s, more preferably not more than 75.7 m/s, even more preferably not more than 75.4 m/s, and most preferably not more than 75 m/s. A core rebound outside of this range is undesirable because the distance of the ball may dramatically decline or it may become difficult to provide a golf ball which conforms with the Rules of Golf.

Figure 2:
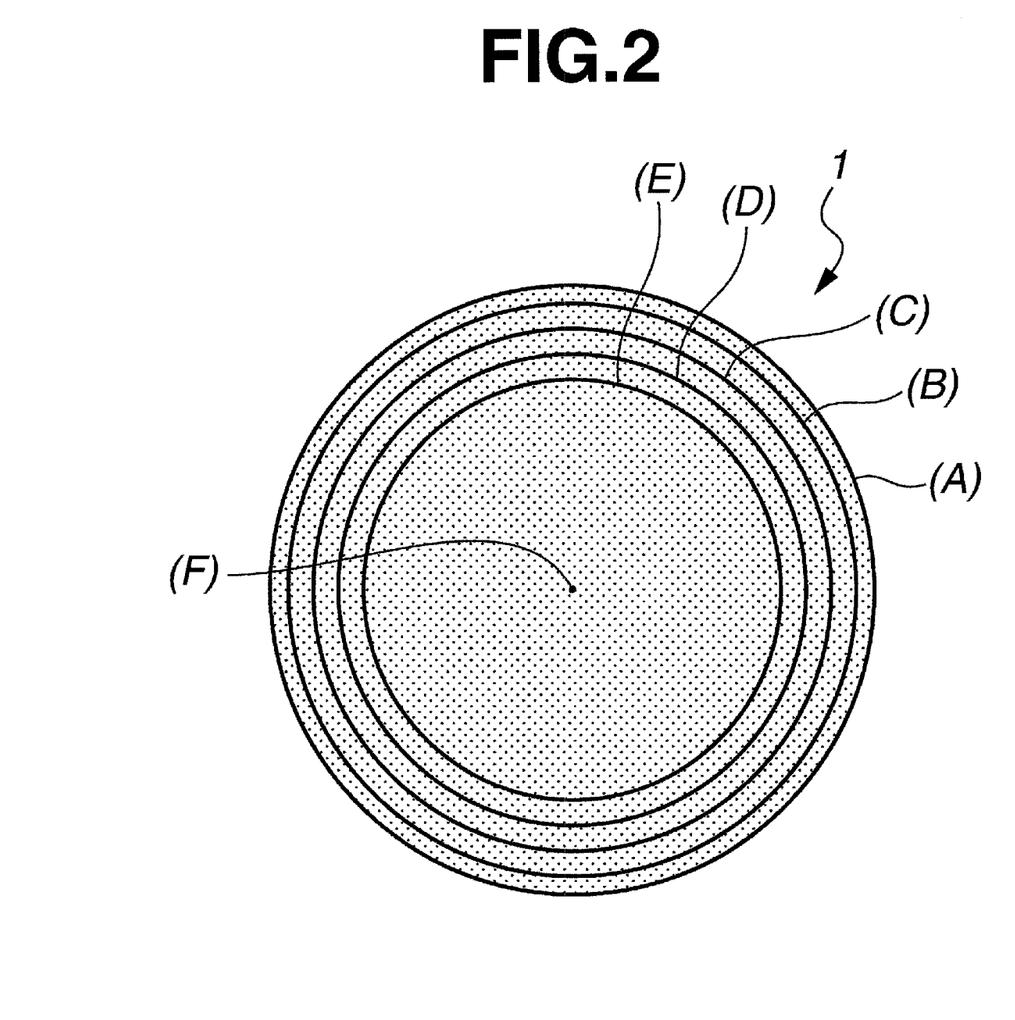
FIG. 2 is a schematic diagram of a core illustrating positions A to F in the core hardness profile.

In the present invention, as shown in the schematic diagram of the core in FIG. 2, letting A be the JIS-C hardness at a surface of the core, B be the JIS-C hardness at a position 2 mm inside the core surface, C be the JIS-C hardness at a position 5 mm inside the core surface, D be the JIS-C hardness at a position 10 mm inside the core surface, E be the JIS-C hardness at a position 15 mm inside the core surface, and F be the JIS-C hardness at the center of the core, it is preferable for the respective values A to F to fall within the specific ranges indicated below. By thus setting the hardness profile at the core interior within specific ranges, both a comfortable feel on impact and a good durability to cracking can be obtained.

Letting A be the JIS-C hardness at the surface of the core, the value of A is typically at least 60, preferably at least 63, more preferably at least 65, and even more preferably at least 67, with the upper limit typically being not more than 88, preferably not more than 86, and more preferably not more than 84.

Letting B be the JIS-C hardness at a position 2 mm inside the core surface, the value of B is typically at least 54, preferably at least 57, more preferably at least 59, and even more preferably at least 61, with the upper limit being typically not more than 83, preferably not more than 81, and even more preferably not more than 79.

Letting C be the JIS-C hardness at a position 5 mm inside the core surface, the value of C is typically at least 56, preferably at least 59, more preferably at least 62, and even more preferably at least 65, with the upper limit typically being not more than 85, preferably not more than 83, and more preferably not more than 81.

Letting D be the JIS-C hardness at a position 10 mm inside the core surface, the value of D is typically at least 54, preferably at least 57, more preferably at least 60, and even more preferably at least 63, with the upper limit being typically not more than 80, preferably not more than 78, and more preferably not more than 76.

Letting E be the JIS-C hardness at a position 15 mm inside the core surface, the value of E is typically at least 51, preferably at least 54, more preferably at least 57, and even more preferably at least 60, with the upper limit being typically not more than 75, preferably not more than 73, more preferably not more than 71, and even more preferably not more than 70.

Letting F be the JIS-C hardness at the center of the core, the value of F is typically at least 48, preferably at least 51, more preferably at least 54, and even more preferably at least 57, with the upper limit being typically not more than 72, preferably not more than 70, and more preferably not more than 68.

Moreover, in the above core hardness profile, it is essential for the hardness relationship A>B<C≤D>E>F to be satisfied, for the value A-F to be not more than 19, for the core to be formed in such a way that A has the highest value among A to F, and for the value A-C to be in a range of from 0 to 8. If the above conditions are not satisfied, the ball may have a diminished feel on impact and a reduced durability to cracking.

The value of A-C is typically within a range of from 0 to 8, with the lower limit being preferably at least 0, and more preferably at least 1, and the upper limit being preferably not more than 6, and more preferably not more than 4. The value of A-F is typically not more than 19, with the lower limit being preferably at least 3, more preferably at least 5, and even more preferably at least 7.

The present invention blends specific rubber powders (I-a) and (I-b) and also (II) a polyurethane resin powder with the above-described rubber ingredients of the core. The rubber powders (I) and the polyurethane resin powder (II) used in the invention may be obtained by Method (i) or Method (ii) below.

Method (i)

Materials obtained by finely grinding, in cases where golf ball covers have been formed of a polyurethane resin, the resin from runners and the flash generated when molding such golf ball covers-both of which are discarded as scrap, defectively molded golf ball cores, and also the powder obtained when golf balls and golf ball cores are surface ground, can be advantageously used as the specific rubber powders (I-a) and (I-b) and the polyurethane resin powder (II).

Method (ii)

Use can be made of materials obtained by employing a granulator to finely grind defective moldings and golf balls which have been used and discarded, screening the finely ground material, and thereby collecting specific rubber powders (I-a) and (I-b) and a polyurethane resin powder (II) having particle sizes at or below a given size.

The grinding size or average particle size of the polyurethane resin powder (II) is preferably not more than 2.0 mm, more preferably not more than 1.5 mm, and even more preferably not more than 1.0 mm. If the grinding size or average particle size of the rubber powder (I) and the polyurethane resin powder (II) exceeds the above size, the durability of the golf ball may be lost, in addition to which it may not be possible to ensure sufficient adhesion by an anchoring effect.

The polyurethane resin powder (II) may be either a thermoplastic polyurethane or a thermoset polyurethane resin, although the use of a thermoplastic polyurethane is more preferred.

The present invention, by including together three types of powder-namely, two specific rubber powders (I-a) and (I-b) and a polyurethane resin powder (II)—in the core material as mentioned above, imparts a suitable surface roughness to the core, thereby making it possible to increase the contact surface area with the adjoining cover and improve adhesion by way of an anchoring effect. In particular, by using a thermoplastic polyurethane in the cover material, the polyurethane resins included in the cover material and the core material melt during molding of the cover material, enabling adhesion between the core and the cover to be increased even further.

Rubber Powder (I-a)

In the invention, it is critical for the above rubber powder (I-a) to include, as an essential ingredient, methacrylic acid or a metal salt thereof. By using (I-a) a rubber powder containing methacrylic acid (MAA) or a metal salt thereof, it is possible in particular to enhance the durability of the golf ball. That is, a material obtained by granulating the above-mentioned core material can be advantageously used as the rubber powder (I-a), in which case the rubber material that is granulated will include methacrylic acid (MAA) or a metal salt thereof as the unsaturated carboxylic acid or a metal salt thereof. The content of the methacrylic acid or a metal salt thereof which is included in the foregoing rubber powder (I-a) may be set to preferably at least 5 wt %, more preferably at least 10 wt %, and even more preferably at least 15 wt %. The upper limit may be set to preferably not more than 60 wt %, more preferably not more than 50 wt %, even more preferably not more than 40 wt %, and most preferably not more than 30 wt %. If the content is too small, the durability may be inferior, and if the content is too large, the rebound may decrease.

The content of the rubber powder (I-a) itself, per 100 parts by weight of the base rubber in the rubber composition, is preferably at least 0.05 part by weight, and more preferably at least 0.1 part by weight. The upper limit is preferably not more than 30 parts by weight, more preferably not more than 20 parts by weight, and even more preferably not more than 10 parts by weight. If the content is too small, the durability may become inferior, whereas if it is too large, the moldability of the rubber material may markedly decrease.

Rubber Powder (I-b)

In the invention, it is critical for the above rubber powder (I-b) to include, as an essential ingredient, acrylic acid (AA) or a metal salt of acrylic acid. By using a rubber powder (I) containing acrylic acid (AA) or a metal salt of acrylic acid, a good golf ball durability is maintained, along with which the initial velocity of the ball is increased, enabling the distance traveled by the ball to be enhanced. That is, a material obtained by granulating the above-mentioned core material can be advantageously used as the rubber powder (I-b), in which case acrylic acid (AA) or a metal salt thereof is included as an unsaturated carboxylic acid or a metal salt thereof in the rubber material that is granulated. Examples of metal salts of acrylic acid include zinc acrylate (ZDA), magnesium acrylate, sodium acrylate, potassium acrylate, aluminum acrylate and calcium acrylate. The content of the acrylic acid or a metal salt thereof which is included in the rubber powder (I-b) may be set to preferably at least 3 wt %, more preferably at least 10 wt %, and even more preferably at least 15 wt %. The upper limit may be set to preferably not more than 30 wt %, more preferably not more than 20 wt %, and even more preferably not more than 10 wt %. If the content is too small, the durability may be inferior, and if the content is too large, the rebound may decrease.

The content of the rubber powder (I-b) itself, per 100 parts by weight of the base rubber in the rubber composition, is preferably at least 0.05 part by weight, and more preferably at least 0.1 part by weight. The upper limit is preferably not more than 30 parts by weight, more preferably not more than 20 parts by weight, and even more preferably not more than 10 parts by weight. If the content is too small, the durability may become inferior, whereas if it is too large, the workability may markedly decrease.

The relative proportions of above rubber powders (I-a) and (I-b), expressed as a weight ratio, are preferably from 10:90 to 95:5, more preferably from 20:80 to 90:10, and even more preferably from 30:70 to 80:20.

The content of the polyurethane resin powder (II), per 100 parts by weight of the rubber component, is at least 0.05 part by weight, preferably at least 0.1 part by weight, more preferably at least 1.5 parts by weight, even more preferably at least 3 parts by weight, and most preferably at least 5 parts by weight. The upper limit is preferably not more than 40 parts by weight, more preferably not more than 30 parts by weight, even more preferably not more than 20 parts by weight, and most preferably not more than 10 parts by weight.

When use is made of the above-described thermoplastic polyurethane powder, it is preferable to use such a powder having a flow starting point of at least 150° C. The flow starting point is more preferably at least 160° C., and even more preferably at least 170° C. The upper limit is preferably not more than 320° C., more preferably not more than 300° C., and even more preferably not more than 280° C. If the flow starting point is too low, the powder will end up melting at the time of core vulcanization, which may result in a loss of core durability and symmetry. On the other hand, if the flow starting point of the powder is too high, it will not be possible to melt the polyurethane at the surface during molding of the cover, as a result of which an additional durability improving effect arising from the use of a thermoplastic polyurethane may not be attainable.

The core used in the invention is not subject to any particular limitation. However, by treating the core surface with a solution containing a haloisocyanuric acid and/or a metal salt thereof, then encasing the treated core with the cover material, golf ball adhesion can be improved. The haloisocyanuric acid and/or a metal salt thereof is preferably one or more selected from among chloroisocyanuric acid, sodium chloroisocyanurate, potassium chloroisocyanurate, dichloroisocyanuric acid, sodium dichloroisocyanurate, potassium dichloroisocyanurate and trichloroisocyanuric acid. These are readily hydrolyzed by water to form acid and chlorine, and thus play an initiator-like role in addition reactions to the double bonds in the diene rubber molecules. The use of trichloroisocyanuric acid is preferred because it provides an especially outstanding adhesion-improving effect.

The rubber composition containing the respective above ingredients is prepared by mixture using an ordinary mixing apparatus, such as a Banbury mixer or a roll mill. When the above rubber composition is used to mold a core, molding may be carried out by compression molding or injection molding in a given core mold. The molding thus obtained is heated and cured under temperature conditions sufficient for the organic peroxide and the co-crosslinking agent included in the rubber composition to act, thereby giving a core having a specific hardness profile. Although the vulcanization conditions are not subject to any particular limitation, the vulcanization temperature is generally in a range of about 150° C. to 200° C., with the lower limit being preferably at least 155° C. and the upper limit being preferably not more than 180° C., more preferably not more than 175° C., and most preferably not more than 170° C. The vulcanization time is generally in a range of about 10 to 40 minutes, with the lower limit being preferably at least 12 minutes and the upper limit being preferably not more than 30 minutes, more preferably not more than 25 minutes, and most preferably not more than 20 minutes.

Next, the material making up the cover which directly encases the core is described.

In this invention, although not subject to any particular limitation, it is preferable for the resin component of the cover to be composed primarily of polyurethane. Use may be made of a thermoplastic polyurethane elastomer or a thermoset polyurethane resin, with the use of a thermoplastic polyurethane elastomer being especially preferred.

Thermoplastic polyurethane elastomers have a structure composed of soft segments formed from a polymeric polyol (polymeric glycol) and hard segments formed from a chain extender and a diisocyanate. Here, the polymeric polyol serving as a starting material may be any which has hitherto been used in the art relating to thermoplastic polyurethane materials, and is not subject to any particular limitation. Exemplary polymeric polyols include polyester polyols and polyether polyols. Polyether polyols are more preferable than polyester polyols because thermoplastic polyurethane materials having a high rebound resilience and excellent low-temperature properties can be synthesized. Illustrative examples of polyether polyols include polytetramethylene glycol and polypropylene glycol. Polytetramethylene glycol is especially preferred from the standpoint of the rebound resilience and the low-temperature properties. The polymeric polyol has an average molecular weight of preferably from 1,000 to 5,000. To synthesize a thermoplastic polyurethane material having a high rebound resilience, an average molecular weight of from 2,000 to 4,000 is especially preferred.

The chain extender employed is preferably one which has hitherto been used in the art relating to thermoplastic polyurethane materials. Illustrative examples include, but are not limited to, 1,4-butylene glycol, 1,2-ethylene glycol, 1,3-butanediol, 1,6-hexanediol and 2,2-dimethyl-1,3-propanediol. These chain extenders have an average molecular weight of preferably from 20 to 15,000.

The diisocyanate employed is preferably one which has hitherto been used in the art relating to thermoplastic polyurethane materials. Illustrative examples include, but are not limited to, aromatic diisocyanates such as 4,4'-diphenylmethane diisocyanate, 2,4-toluene diisocyanate and 2,6-toluene diisocyanate, and aliphatic diisocyanates such as hexamethylene diisocyanate. Depending on the type of isocyanate, control of the crosslinking reaction during injection molding may be difficult. In this invention, the use of 4,4'-diphenylmethane diisocyanate, which is an aromatic diisocyanate, is most preferred.

A commercial product may be advantageously used as the thermoplastic polyurethane material composed of the above materials. Illustrative examples include those available under the trade names Pandex T8180, Pandex T8195, Pandex T8290, Pandex T8295 and Pandex T8260 (all available from DIC Bayer Polymer, Ltd.), and those available under the trade names Resamine 2593 and Resamine 2597 (available from Dainichiseika Color & Chemicals Mfg. Co., Ltd.).

The polyurethane, although not subject to any particular limitation, is preferably a material which is capable of fusion-bonding with the above-described polyurethane resin powder (II). A resin which is thermoplastic in the same way as the polyurethane resin powder (II) is preferred because fusion-bonding can be expected to occur. In particular, preferred use may be made of a polyurethane having a high isocyanate content because adhesion with the core material can thereby be improved.

The cover thickness, although not subject to any particular limitation, is preferably at least 0.3 mm, more preferably at least 0.5 mm, and even more preferably at least 0.7 mm. The upper limit is preferably not more than 2.1 mm, more preferably not more than 1.9 mm, even more preferably not more than 1.8 mm, and most preferably not more than 1.7 mm. If the cover thickness is larger than the above range, the ball rebound may decrease, worsening the flight performance. On the other hand, if the cover thickness is smaller than the above range, the durability to cracking may decrease. In particular, tearing of the cover may occur when the ball is "topped."

The cover has a specific gravity which is preferably at least 1.13, more preferably at least 1.14, and even more preferably at least 1.15, but is preferably not more than 1.30, more preferably not more than 1.20, and even more preferably not more than 1.17.

The cover has a material hardness which, although not subject to any particular limitation, when expressed in terms of Shore D hardness, is preferably at least 30, more preferably at least 35, and even more preferably at least 38; the upper limit is preferably not more than 57, more preferably not more than 55, even more preferably not more than 53, and still more preferably not more than 51. If the Shore D hardness of the cover is higher than the above range, the appearance performance in long-term use (durability of markings) may decline, in addition to which the flight performance may greatly decrease. On the other hand, if the Shore D hardness of the cover is lower than the above range, the durability to cracking may greatly decrease and, particularly when the ball is topped, tearing of the cover may occur. In addition, the spin rate may become very high, shortening the distance traveled by the ball. In the invention, the Durometer D hardness refers to the measured hardness obtained with a type D durometer in general accordance with JIS K7215.

The golf ball of the invention has, upon initial measurement, a ball deflection $BH1$ (mm) when compressed under a final load of 1,275 N (130 kgf) from an initial load of 98 N (10 kgf) and an initial velocity $BV1$ (m/s) and, when measured again after being left to stand for 350 days following initial measurement, has a ball deflection $BH2$ (mm) when compressed under a final load of 1,275 N (130 kgf) from an initial load of 98 N (10 kgf) and a ball initial velocity $BV2$ (m/s), such that the difference $BH2-BH1$ is typically not more than 0.2 mm, preferably not more than 0.15 mm, and more preferably not more than 0.1 mm, and such that the difference $BV2-BV1$ is typically not more than 0.3 m/s, preferably not more than 0.2 m/s, and more preferably not more than 0.1 m/s. As a result, even during prolonged used, the ball maintains a good appearance and good flight performance.

The above ball deflection $BH1$ is preferably at least 2.0 mm, more preferably at least 2.3 mm, and even more preferably at least 2.4 mm, with the upper limit being preferably not more than 7.0 mm, more preferably not more than 5.0 mm, and even more preferably not more than 4.0 mm. If the deflection is too small, the feel on impact will harden, which may make the ball unpleasant to use. On the other hand, if the deflection is too large, the durability to cracking may undergo a large decrease.

Numerous dimples may be formed on a surface of an outermost layer of the cover. Known art may be suitably employed with regard to the number and shapes of the dimples. Also, a coat of paint may be applied to the surface of the ball, in which case known art may be suitably employed with regard to the paint and the painting process.

The ball has a diameter of generally not less than 42 mm, preferably not less than 42.3 mm, and more preferably not less than 42.67 mm, with the upper limit being generally not more than 44 mm, preferably not more than 43.8 mm, even more preferably not more than 43.5 mm, and still more preferably not more than 43 mm.

The ball has a weight of preferably not less than 44.5 g, more preferably not less than 44.7 g, even more preferably not less than 45.1 g, and most preferably not less than 45.2 g, with the upper limit being preferably not more than 47.0 g, more preferably not more than 46.5 g, and even more preferably not more than 46.0 g.

As described above, the solid golf ball of the invention, by utilizing a waste material, conserves natural resources and thus contributes to the global environment. Moreover, the inventive golf ball maintains a high rebound and initial velocity in spite of having a polyurethane cover, thus increasing the distance traveled by the ball, and moreover is able to enhance the durability of the ball to cracking. The solid golf ball of the invention also has an excellent adhesion between the core and the cover.

EXAMPLES

Examples of the invention and Comparative Examples are given below by way of illustration, and not by way of limitation.

Examples 1 to 6, Comparative Examples 1 to 6

Rubber compositions (MAA blend and ZDA blend) made up of the ingredients shown in Table 1 below were used. A polyurethane resin powder, a zinc acrylate (ZDA)-containing rubber powder, and a methacrylic acid (MAA)-containing rubber powder were included in the core formulations in each example of the invention. That is, granulated polyurethane scrap from molding operations and also urethane resin powder obtained by granulating golf balls in which polyurethane resin serves as the cover material were used, these urethane resin powders being charged together with the various materials in Table 1 below during mixing. In addition, a zinc acrylate (ZDA)-containing rubber powder and a methacrylic acid (MAA)-containing rubber powder, both prepared by finely grinding the powders obtained when golf balls and golf ball cores were surface ground, were added together with the various materials in Table 1 below. The rubber composition to which the three foregoing components—namely, the polyurethane resin powder, the zinc acrylate (ZDA)-containing rubber powder, and the methacrylic acid (MAA)-containing rubber powder—had been added was kneaded for 15 minutes, then vulcanized at 170° C. for 20 minutes, thereby fabricating the solid cores for the respective examples. Ingredient amounts in Table 1 are shown in parts by weight. The core formulations in Comparative Examples 1 and 2 are examples in which a polyurethane resin powder was not included, and the core formulations in Comparative Examples 3 to 5 are examples in which a zinc acrylate (ZDA)-containing rubber powder or a methacrylic acid (MAA)-containing rubber powder was not included; these cores were otherwise fabricated in the same way as the cores in the examples of the invention. The golf ball in Comparative Example 6 is a one-piece golf ball having no cover.

TABLE 1

| Core Formulation | | MAA blend | ZDA blend |
|---|---|---|---|
| cis-1,4-Polybutadiene | | 100 | 100 |
| Zinc oxide | | 23 | 6 |
| Antioxidant | | 0.2 | 0.2 |
| Zinc acrylate | | — | 31 |
| Methacrylic acid | | 22.5 | — |
| Crosslinking agent | Percumyl D | 0.8 | 0.6 |
| (organic peroxide) | Perhexa C-40 | | 0.6 |

Details of the above ingredients are given below. The numbers shown above represent parts by weight.
cis-1,4-Polybutadiene: A butadiene rubber synthesized with a nickel catalyst (Mooney viscosity ML, 46), available as "BR01" from JSR Corporation Zinc oxide: Available from Sakai Chemical Co., Ltd.
Antioxidant: "Nocrac NS-6," available from Ouchi Shinko Chemical Industry Co., Ltd.
Zinc acrylate: Available from Nihon Jyoryu Kogyo Co., Ltd.
Methacrylic acid: Methacrylic acid available from Kuraray Co., Ltd.
Organic peroxides: "Perhexa C-40" (40% dilution product), available from NOF Corporation
"Percumyl D," available from NOF Corporation The cores having a diameter of 39.9 mm that were vulcanized and formulated as described above had the hardness profiles shown in Table 2 below.

Cross-Sectional Hardness of Core
The core was cut with a fine cutter and the JIS-C hardness at each of the positions mentioned below was measured in accordance with JIS K6301-1975 after holding the core isothermally at 23±1° C. (measured at two places in each of N=5 samples).

Surface Hardness of Core
JIS-C hardness measurements were carried out on the core surface in accordance with JIS K6301-1975 after holding the core isothermally at 23±1° C. (measured at two places in each of N=5 samples).

TABLE 2

| Type of Core | Core center (JIS-C hardness) | 15 mm inside core surface (JIS-C hardness) | 10 mm inside core surface (JIS-C hardness) | 5 mm inside core surface (JIS-C hardness) | Core surface (JIS-C hardness) | Center - Surface (JIS-C hardness) |
|---|---|---|---|---|---|---|
| MAA blend | 64 | 67 | 69 | 69 | 72 | 8 |
| ZDA blend | 61 | 65 | 69 | 75 | 78 | 17 |

Adhesion-Enhancing Treatment
After the rubber composition formulated from the ingredients in Table 1 was molded and vulcanized to form a core, the surface of the core was ground to the desired diameter. Next, surface treatment of the core was carried out by immersing the core for 30 seconds in an acetone solution of trichloroisocyanuric acid (concentration, 3 wt %), then rinsing the surface of the core with water. The core was then set in a mold for injection molding the cover, and the cover compositions shown in Tables 3 and 4 below were injection-molded over the solid core.

Next, the cover starting materials indicated below (units are in parts by weight) were worked together under a nitrogen atmosphere in a twin-screw extruder to form a cover resin blend. This cover resin blend was used in common for all the examples of the invention and the comparative examples.

| Cover Formulation | |
|---|---|
| "Pandex T8195" (trade name) | 100 parts by weight |
| Titanium oxide | 3.8 parts by weight |
| Polyethylene wax | 1.5 part by weight |

"Pandex T8195" (trade name): Available under the trademark PANDEX from DIC Bayer Polymer
Polyethylene wax: Available as "Sanwax 161P" from Sanyo Chemical Industries, Ltd.
Titanium oxide: Available under the trade name "Tipaque R550" from Ishihara Sangyo Kaisha, Ltd.

The physical properties, flight performance and other characteristics of the golf balls fabricated by the above procedure were measured and evaluated according to the following methods. The results are presented in Tables 3 and 4.

Ball Appearance

NG: Upon visual examination of ball surface, urethane powder was conspicuous.

Good: Upon visual examination of ball surface, urethane powder was not noticeable.

Peel Test (Adhesion and Tensile Strength)

A tensile tester that included clamps, a drive unit, a force gauge and a recorder was used as the testing apparatus.

The golf ball was mounted on a rotatable fixture, and cuts in the form of a band having a width of 4±0.3 mm were made on the surface of the ball. At this time, in cases where the area of measurement included a cover layer that had been obtained by injection molding with a hemispherical mold, care was taken to make the cuts in such a way as to include at least one injection gate and at least one pole. Here, the term "pole" signifies a north pole or south pole relative to an equator represented by a great circle circumscribing the ball at one or a plurality of injection gates.

Next, a slit was made in the cover surface at the pole, and the cover was peeled off to a length of about 20 mm, thereby preparing the pole so that it can be fixed in a clamp of the tester. One end of the band-like test specimen in which this slit had been made was fixed in a clamp, and pulling was carried out in a 23±2° C. environment at a testing speed of 50 mm/min. The tensile test was continued until the band-like specimen (cover layer) separated completely from the core surface. More specifically, when a load difference suddenly arose (i.e., when a load difference of 0.2 kgf or more occurred) as the test piece was being pulled, this was treated as the endpoint of measurement. Each of the results shown in Table 3 below is an average value for five measurement samples (N=5). Adhesion between the core and the cover layer was rated based on the following criteria.

Excellent (Exc): 4 kgf or more (strong adhesion)
Good: at least 3 kgf, but less than 4 kgf (ample adhesion)
Fair: at least 2 kgf, but less than 3 kgf (some adhesion)
No Good (NG): below 2 kgf (no adhesion)

Ball Initial Velocity

The initial velocity was measured using an initial velocity measuring apparatus of the same type as the USGA drum rotation-type initial velocity instrument approved by the R&A. The ball was held isothermally at a temperature of 23±1° C. for at least 3 hours, then tested in a room temperature (23±2° C.) chamber. Ten balls were each hit twice, and the time taken for a ball to traverse a distance of 6.28 ft (1.91 m) was measured and used to compute the initial velocity. This cycle was carried out over a period of about 15 minutes.

Deflection of Finished Ball

The deflection (mm) of the finished ball when compressed at a temperature of 23±1° C. and a rate of 10 mm/s under a final load of 1,275 N (130 kgf) from an initial load state of 98 N (10 kgf) was measured. The average value for 10 balls (N=10) was determined.

COR Durability to Cracking

The durability of the golf ball to cracking was evaluated using an ADC Ball COR Durability Tester produced by Automated Design Corporation (U.S.). This tester functions so as to fire a golf ball pneumatically and cause it to repeatedly strike two metal plates arranged in parallel. The incident velocity against the metal plates was set at 43 m/s. The number of shots required for the golf ball to crack was measured, and the average for five golf balls (N=5) was determined.

TABLE 3

|  | Example | | | | | |
| --- | --- | --- | --- | --- | --- | --- |
|  | 1 | 2 | 3 | 4 | 5 | 6 |
| Ball content | | | | | | |
| Construction | 2P | 2P | 2P | 2P | 2P | 2P |
| Cover | urethane | urethane | urethane | urethane | urethane | urethane |
| Core blend | MAA blend | MAA blend | MAA blend | MAA blend | MAA blend | ZDA blend |
| Adhesion-enhancing treatment | no | no | no | no | yes | yes |
| Amount of granulated urethane added (content) | 3.75 | 7.5 | 22.5 | 7.5 | 7.5 | 7.5 |
| Amount of MAA powder added (content) | 3.75 | 3.75 | 3.75 | 3.75 | 3.75 | 3.75 |
| Amount of ZDA powder added (content) | 3.75 | 3.75 | 3.75 | 3.75 | 3.75 | 3.75 |
| Particle size | ≤1 mm | ≤1 mm | ≤1 mm | ≥1 mm | ≤1 mm | ≤1 mm |
| Ball evaluation | | | | | | |
| Appearance | good | good | good | good | good | good |
| Peel test (core-cover adhesion), kgf | 2 | 2 | 2 | 2 | 5 | 4 |
| Sensory test of peeling (tensile strength) | fair | fair | fair | fair | Exc | Exc |
| Initial velocity, m/s | 74 | 74 | 73.5 | 74 | 74 | 76.5 |
| Deflection, mm | 3 | 3 | 3 | 3 | 3 | 3 |
| COR durability (number of shots) | 1,400 | 1,400 | 1,400 | 1,400 | 1,900 | 900 |

Notes:
The amounts of granulated urethane, MAA rubber powder and ZDA rubber powder added are indicated in parts by weight per 100 parts by weight of the polybutadiene rubber.
The above-described granulated MAA-containing rubber was used as the MAA rubber powder. Therefore, the amount of MAA included in the rubber powder is presumed to be about 20 to 30 wt %.
The above-described granulated ZDA-containing rubber was used as the ZDA rubber powder. Therefore, the amount of ZDA included in the rubber powder is similarly presumed to be about 25 to 35 wt %.
The particle size applies to all of the following: the granulated urethane, the ZDA rubber powder, and the MAA rubber powder.

TABLE 4

|  | Comparative Example | | | | | |
| --- | --- | --- | --- | --- | --- | --- |
|  | 1 | 2 | 3 | 4 | 5 | 6 |
| Ball content | | | | | | |
| Construction | 2P | 2P | 2P | 2P | 2P | 1P |
| Cover | urethane | urethane | urethane | urethane | urethane | none |
| Core blend | MAA blend | ZDA blend | MAA blend | ZDA blend | ZDA blend | MAA blend |
| Adhesion-enhancing treatment | no | yes | no | yes | yes | no |
| Amount of granulated urethane added (content) | no | no | 7.5 | 7.5 | 7.5 | 7.5 |
| Amount of MAA powder added (content) | 3.75 | 3.75 | no | 7.5 | no | 3.75 |
| Amount of ZDA powder added (content) | 3.75 | 3.75 | 7.5 | no | 7.5 | 3.75 |
| Particle size | ≤1 mm | ≤1 mm | ≤1 mm | ≤1 mm | ≤1 mm | ≤1 mm |
| Ball evaluation | | | | | | |
| Appearance | good | good | good | good | good | NG |
| Peel test (core-cover adhesion), kgf | 1 | 3 | 2 | 4 | 4 | — |
| Sensory test of peeling (tensile strength) | NG | good | fair | Exc | Exc | — |
| Initial velocity, m/s | 74 | 76 | 74.5 | 75.5 | 76 | — |
| Deflection, mm | 3 | 3 | 3 | 3 | 3 | — |
| COR durability (number of shots) | 1,000 | 600 | 1,200 | 1,000 | 800 | — |

Notes:
The same notes apply here as in Table 3 above.

Based on the results in Tables 3 and 4, as shown below, the comparative examples were inferior to the examples of the invention.

The golf ball of Comparative Example 1 contained no urethane powder, as a result of which the durability was poor.

The golf ball of Comparative Example 2 contained no urethane powder, as a result of which the durability was inferior to that in Example 6.

The golf ball of Comparative Example 3 contained no MAA rubber powder, as a result of which the durability was inferior to that in Example 2.

The golf ball of Comparative Example 4 contained no ZDA rubber powder, as a result of which the initial velocity was lower than in Example 6.

The golf ball of Comparative Example 5 contained no MAA rubber powder, as a result of which the durability was inferior to that in Example 6.

The golf ball of Comparative Example 6 was a conventional one-piece type golf ball with an appearance in which urethane powder was conspicuous. Hence, a good appearance was not obtained.

The invention claimed is:

1. A solid golf ball comprising a core of at least one layer and a cover of at least one layer, wherein at least one layer of the core is formed primarily of polybutadiene and includes at least 0.05 part by weight each of (I-a) a rubber powder obtained by granulating a rubber material containing methacrylic acid, (I-b) a rubber powder obtained by granulating a rubber material containing a metal salt of acrylic acid, and (II) a polyurethane resin powder per 100 parts by weight of rubber component, and at least one layer of the cover is formed primarily of a thermoplastic polyurethane elastomer; and wherein the core has a hardness designed so as to gradually increase from a center of the core toward a surface of the core, and wherein the metal salt of acrylic acid in the rubber powder (I-b) is selected from the group consisting of zinc acrylate (ZDA), sodium acrylate, potassium acrylate, aluminum acrylate, and calcium acrylate, and wherein the polyurethane resin powder (II) is granulated by a granulator to an average particle size of not more than 1 mm.

2. The solid golf ball of claim 1, wherein the core layer which includes the polyurethane resin powder (II) adjoins the cover layer composed primarily of polyurethane.

3. The solid golf ball of claim 1, wherein the core includes at least 5 parts by weight of methacrylic acid and/or a metal salt of methacrylic acid as a co-crosslinking agent per 100 parts by weight of rubber component.

4. The solid golf ball of claim 1, wherein the polyurethane resin powder (II) is composed primarily of thermoplastic polyurethane and has a flow starting point of from 150 to 320° C.

5. The solid golf ball of claim 1 which has been produced by treating a surface of the core with a solution containing a haloisocyanuric acid and/or a metal salt thereof, then encasing the core in a cover layer.

6. The solid golf ball of claim 1, wherein, when A is the JIS-C hardness at a surface of the core, B is the JIS-C hardness at a position 2 mm inside the core surface, C is the JIS-C hardness at a position 5 mm inside the core surface, D is the JIS-C hardness at a position 10 mm inside the core surface, E is the JIS-C hardness at a position 15 mm inside the core surface, and F is the JIS-C hardness at the center of the core, the following hardness relationship is satisfied:

$$A > B < C \geq D > E > F.$$

7. The solid golf ball of claim 6, wherein the value of A-C is from 0 to 8 and the value of A-F is not more than 19.

* * * * *